United States Patent [19]

Hollowbush

[11] Patent Number: 5,059,946
[45] Date of Patent: Oct. 22, 1991

[54] ULTRASONIC OBSTACLE DETECTOR

[76] Inventor: Richard R. Hollowbush, 38 Conrad Rd., Fleetwood, Pa. 19522

[21] Appl. No.: 350,149

[22] Filed: May 10, 1989

[51] Int. Cl.$^5$ .......................... G08G 1/16; G01S 15/00
[52] U.S. Cl. .................................. 340/435; 340/903; 340/904; 340/943; 367/140; 367/909
[58] Field of Search ............... 340/901, 903, 904, 933, 340/943, 961, 435; 367/110, 111, 112, 140, 909; 180/169

[56] References Cited

U.S. PATENT DOCUMENTS

| | | | |
|---|---|---|---|
| 3,138,779 | 6/1964 | Murray, Jr. et al. | 340/955 |
| 4,240,152 | 12/1980 | Duncan et al. | 340/901 |
| 4,467,313 | 8/1984 | Yoshino et al. | 340/903 |
| 4,500,977 | 2/1985 | Gelhard | 367/108 |
| 4,528,563 | 7/1985 | Takeuchi | 340/903 |
| 4,561,064 | 12/1985 | Brüggen et al. | 340/904 |
| 4,581,685 | 4/1986 | Kago et al. | 367/140 |
| 4,626,850 | 12/1986 | Chey | 340/903 |
| 4,636,997 | 1/1987 | Toyama et al. | 340/904 |
| 4,757,450 | 7/1988 | Etoh | 340/904 |
| 4,779,095 | 10/1988 | Guerreri | 340/901 |
| 4,939,703 | 7/1990 | Muller | 367/140 |

OTHER PUBLICATIONS

IEEE Spectrum, "System Hazards", p. 47, Nov. 1986.

*Primary Examiner*—Joseph A. Orsino
*Assistant Examiner*—Brent A. Swarthout
*Attorney, Agent, or Firm*—Leonard Michael Quittner

[57] ABSTRACT

The ultrasonic device which is sensitive to a selectably defined range for giving warning to a vehicle operator while backing which indicates visually an obstruction substantially out of range, close to range and within range coupled with an in range audio alarm giving an intermittent tone at a defined pulse rate which rate approaches non-pulsating as the object approaches within 25% of the selected range. A convex reflector of a defined radius in conjunction with angularly upright baffles disposed on the convexity is coupled to the transmitting/receiving transducer to generate an ultrasonic beam which encompasses objects anywhere in the range area adjacent to the vehicle's rear edge.

21 Claims, 4 Drawing Sheets

ULTRASONIC OBSTACLE DETECTOR

CROSS REFERENCES

There are no cross-references to, nor are there any, related applications.

FEDERALLY SPONSORED RIGHTS

The invention herein was made without any Federal sponsorship or contribution.

BACKGROUND OF THE INVENTION

1. The Field of the Invention

The field of the invention relates to an improved ultrasonic detector mounted on an automotive vehicle to detect an object obstructing the path of the vehicle particularly when the vehicle is traveling in reverse.

2. Description of the Prior Art

Ultrasonic devices for detection of obstructions in a vehicle's pathway are known. U.S. Pat. No. 4,103,278 (July 25, 1978 to Satake, et. al.) teaches the use of two receivers coupled to one motor driven transmitter/receiver in conjunction with a motor driven display which makes possible a visual representation on a CRT grid of the location of the obstacle. U.S. Pat. No. 4,500,977 (Feb. 19, 1985 to Gelhard) teaches wave focusing by certain shaped reflector means including concave reflectors to focus an ultrasonic beam narrowly for detection of the distance of obstacles with extreme accuracy. Included is a complex visual display with digital information provided thereon. U.S. Pat. No. 4,528,563 (July 9, 1985 to Takeuchi) utilizes 4 transmitters, 4 receivers and 4 speakers disposed at the corners of a vehicle to produce an intermittent tone in a loud speaker situated interiorly at the corner of the vehicle nearest to the obstruction. The tone provides information about the distance off of the object by means of a tone pulse period which is proportional to the distance. U.S. Pat. No. 4,561,064 (Dec. 24, 1985 to Bruggen, et.al.) utilizes separate transmitter and receiver means in combination with an undifferentiated audible tone emitted at a fixed distance and has reflecting feed back means to verify operation. U.S. Pat. No. 4,580,250 (Apr. 1, 1986 to Kago et al) teaches obstacle detection in conjunction with an intervehicle communication system utilizing front and rear mounted transducer modules. U.S. Pat. No. 4,551,722 (Nov. 5, 1985 to Tsuda et al) teaches the attenuation or elimination of false signals received from distant objects.

The prior art references do not teach a simplified device which provides timely, easily discernible and useful information to the operator while backing up. None teaches the design of a reflector which reflects outward from a single combined transmitter/receiver/transducer a broadly flattened beam widened to be contiguous to the stern of the vehicle and which is interpretable as an audio-visual signal responsive to distance off to impart instantly useful information to the operator such that his attention is not diverted unduly from the task of backing.

SUMMARY OF THE INVENTION

The invention herein is summarized as an ultrasonic transmitter/receiver/transducer unit whose ultrasonic wave is directed downwardly to a convex reflector of a unique design for creating a beam which is wide and flat. The device interprets echoes caused by the beam indicative of the distance off of an object obstructing the pathway of a vehicle. The device is particularly useful in backing.

Coupled to the device is an audio-visual display simplified for rapid interpretation by first signaling visually through a color change the approach of the vehicle to an object just outside of a selectably defined range. Second, when the object is within the range, a pulsed audio signal is heard which increases in its pulse width to signify an increasingly closer approach to the object within the range. A virtually steady audio signal is provided at approximately 25% of the selected range. For example, if a 4 foot range is selected, the approach of the obstruction will be signaled visually from outside of 4 feet by a color change in a visual display (from green for far off to yellow near the 4 foot distance to red within the 4 foot distance). Within 4 feet, a pulsating tone is sounded which becomes steady at approximately 1 foot off to indicate that the vehicle is virtually upon the obstruction.

By mounting the unit centrally rearward, coverage of the entire stern of the vehicle is enabled since beam form's unique character namely wide and flat, traverses and creates a detection zone in the space adjacent to the stern.

An object of the invention is to provide a single simple ultrasonic detector which is sensitive to objects obstructing the pathway of a backing vehicle within the whole of the vehicle's advancing edge.

Another object is to provide information to the vehicle operator in a format which is rapidly interpreted but accurate enough to make a judgment about continuing on a particular pathway.

DESCRIPTION OF THE DRAWINGS

The present invention may be better understood by reference to the drawings wherein 6 figures are shown on 4 sheets. The numbers shown on the drawings for the various parts of the invention are consistent throughout so that a number indicating a part in one drawing will indicate the same part in another drawing.

DESCRIPTION OF THE PREFERRED EMBODIMENT

Figure 1:
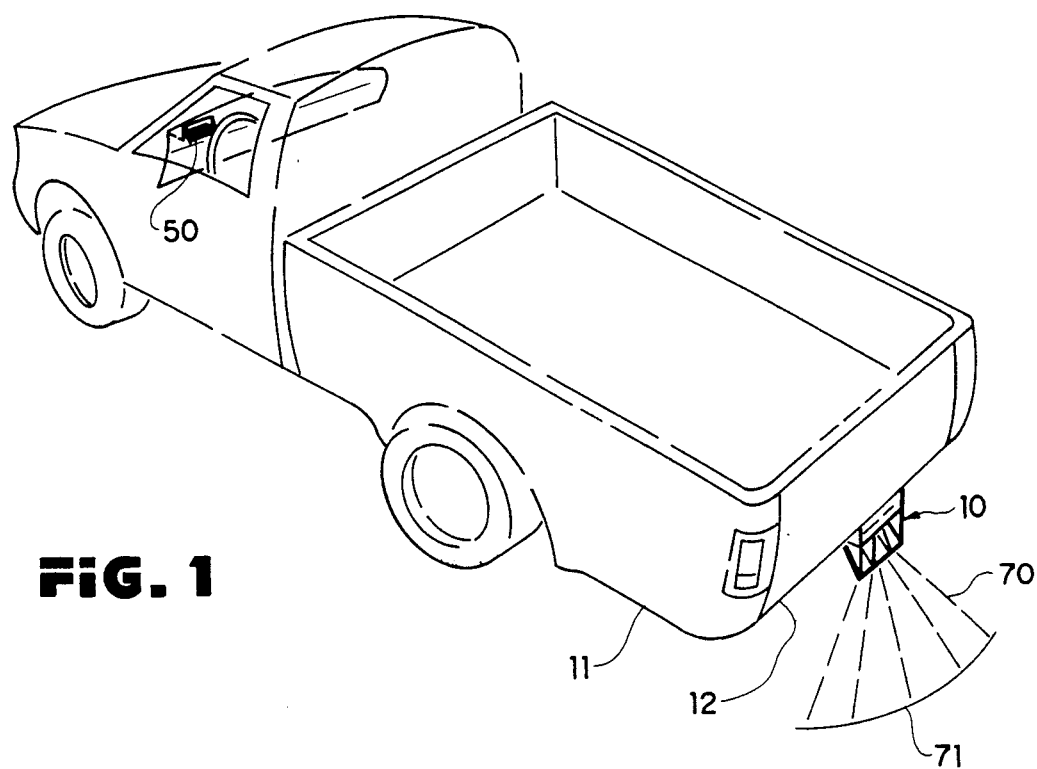
FIG. 1 depicts an ultrasonic beam producing unit of the invention mounted below a rear bumper of a vehicle.
Figure 2:
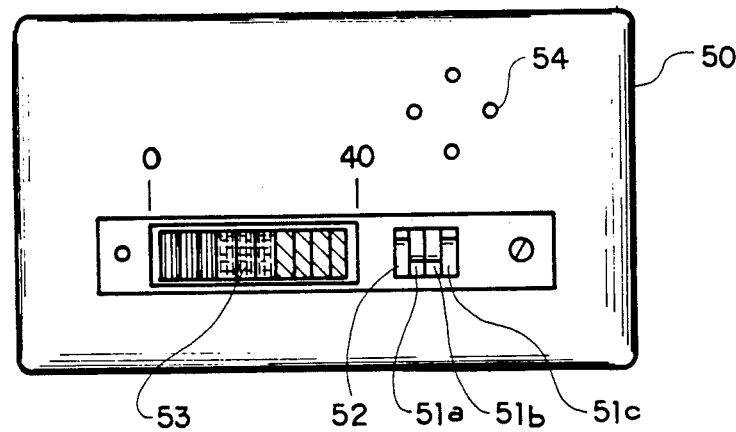
FIG. 2 shows an audio-visual display to be mounted on the vehicle's dashboard which is coupled to the unit.
Figure 3:
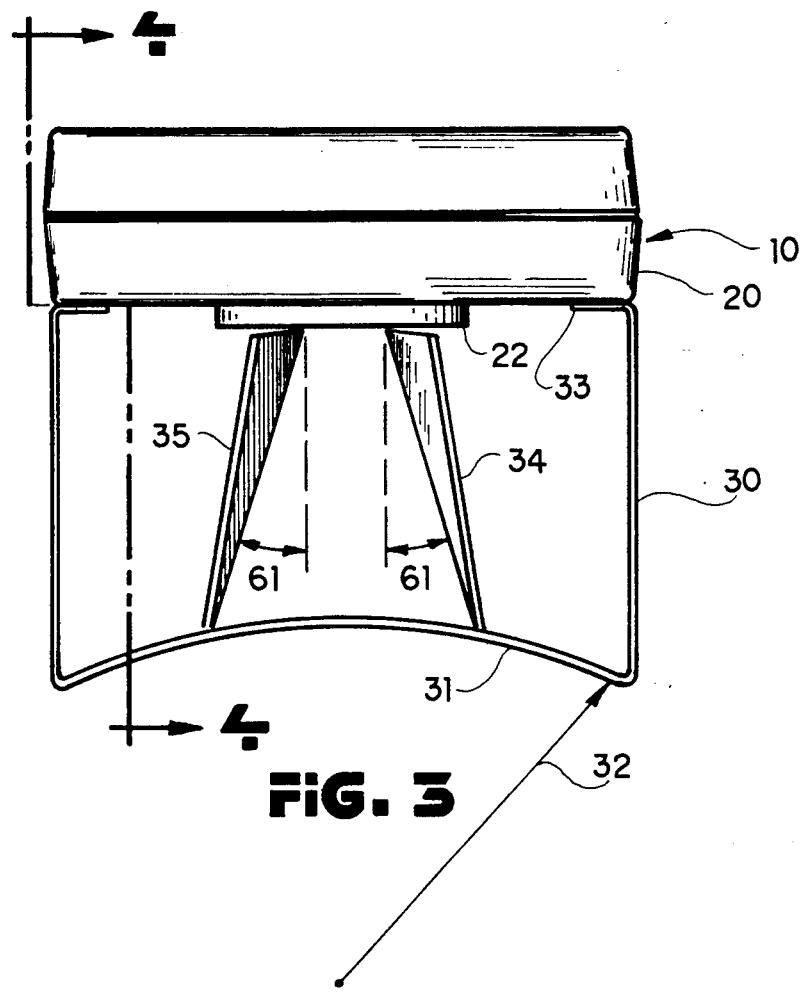
FIG. 3 is a front elevation of the reflector of the invention.
Figure 4:
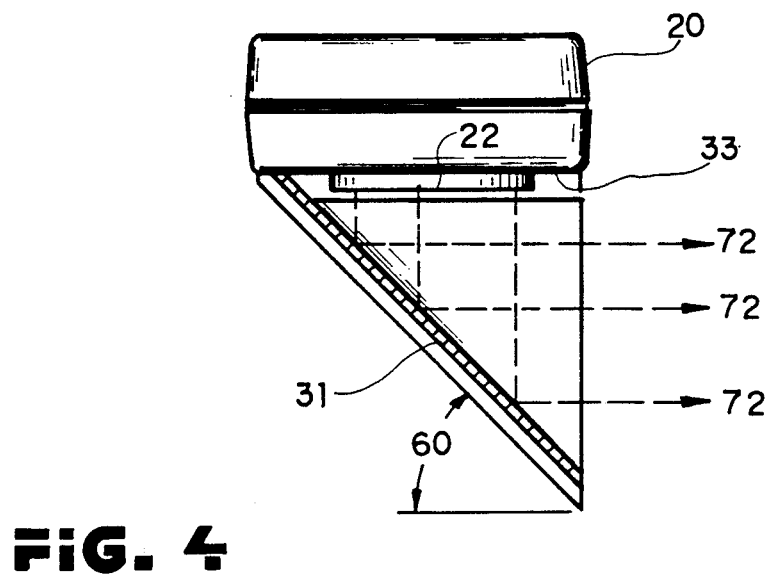
FIG. 4 is a cross sectional view of the reflector through Line 4—4 in FIG. 3.
Figure 6:
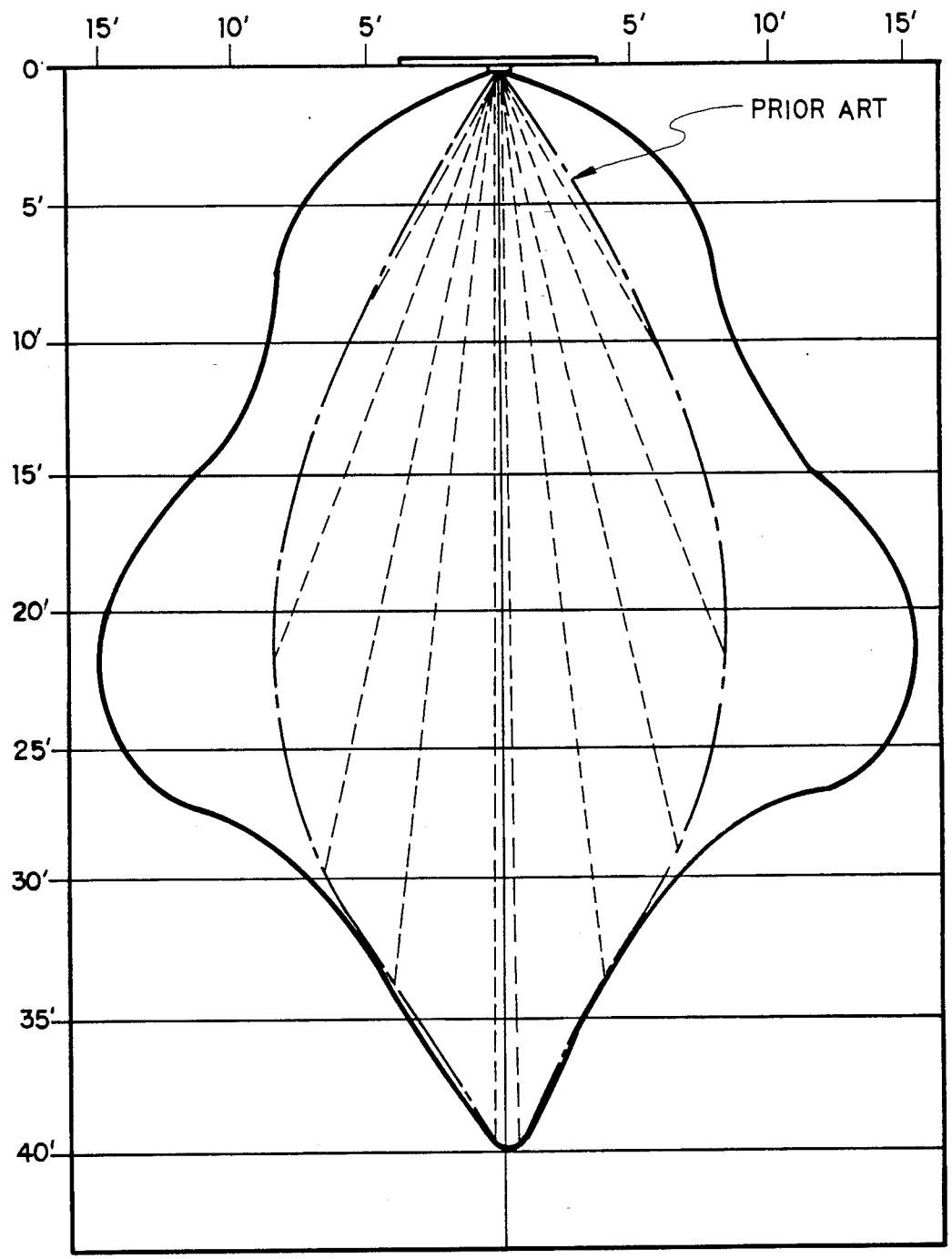
FIG. 6 is a diagram showing in broken lines a conventionally focused beam pattern (labeled "prior art") which yields a conventional detection zone. Superimposed thereon in solid lines is the focused beam pattern of the reflector of the invention showing the enhanced detection zone of the invention into the region adjacent to the stern of the vehicle.

The preferred embodiment is described as consisting of an ultrasonic device 10 for the detection of objects in the pathway of a backing vehicle 11 which is mounted centrally on the stern 12 and is comprised of a transmitter/receiver/ transducer package 20 for generating ultrasonic waves installed over a housing 30 containing a reflector 31 mounted at a defined angle of reflectance 60. The reflector is convex and has a defined radius of convexity 32 in shape to focus the wave into a broadened beam and hooded 33 to flatten it to a height substantially less than the height of the vehicle. A pair of upright wave guides 34, 35 or baffles are disposed on the convex surface to divide the surface equidistantly and are inclined away from each other centrally at a defined angle 61, to direct the beam pattern's width such that the vehicle's stern 12 approximately defines the transverse axis 70 of a detection zone 71 rearward from the vehicle. See FIGS. 1 and 6. The transducer's output face 22 is disposed vertically downward over the reflector centrally such that ultrasonic rays 72 emitted by the transducer will bounce off of the reflector in a defined beam pattern as shown in FIG. 6, solid lines. The beam originates as a wave pulse generated by the transmitter/transducer which undergoes focusing by the convex surface of the reflector in combination with the baffles such that a ray reflected therefrom is projected transversely to the path of the vehicle in the region adjacent to the stern. Rays which strike the reflector first, so long as they do not at the peak of the reflector's convexity will be reflected downward away from the transverse axis 70 fanwise 71. Rays which strike the wave guides first will be reflected glancingly off the reflector. The net result is to produce a beam which is substantially widened along the vehicle's stern.

Your inventor has discovered that the radius of convexity of the reflector and the angle from the vertical of the wave guide are critical. Too much curvature or too much angle will produce dead zones in the resultant beam pattern. A radius of convexity of 4.5 inches and wave guides installed at 10 degrees from the vertical give excellent results.

The positioning of the transducer vibrating face downward has the additional advantage of producing a self-cleaning action which causes dirt particles to become dislodged and fall away.

Adjacent to the operator, mounted typically on the vehicle's dashboard, is an audio-visual display unit 50 connected to the ultrasonic beam producing unit. Selector switches 51 a,b,c, are provided to select a defined detection range, typically 4, 8 or 12 feet. A further switch 52 will provide selectively information either continuously or only when the vehicle is backing. The visual component 53 of the display is an LED array comprised of ten upright bars in three colors, green, yellow and red. When a distance is selected, the visual display will indicate green to show that an obstruction is present but out of range, typically up to 40 feet. The bars indicate yellow when the obstruction is closing but still out of the preset range, typically 130 percent of the range. Red is indicated to show the object is within the desired range.

When an obstruction is in range, an alarm 54, an audio pulse of a defined width, is sounded intermittently. The pulse width increases as the obstruction is approached such that a virtually steady alarm tone is heard when the obstruction is within 25% of the selected range.

Figure 5:
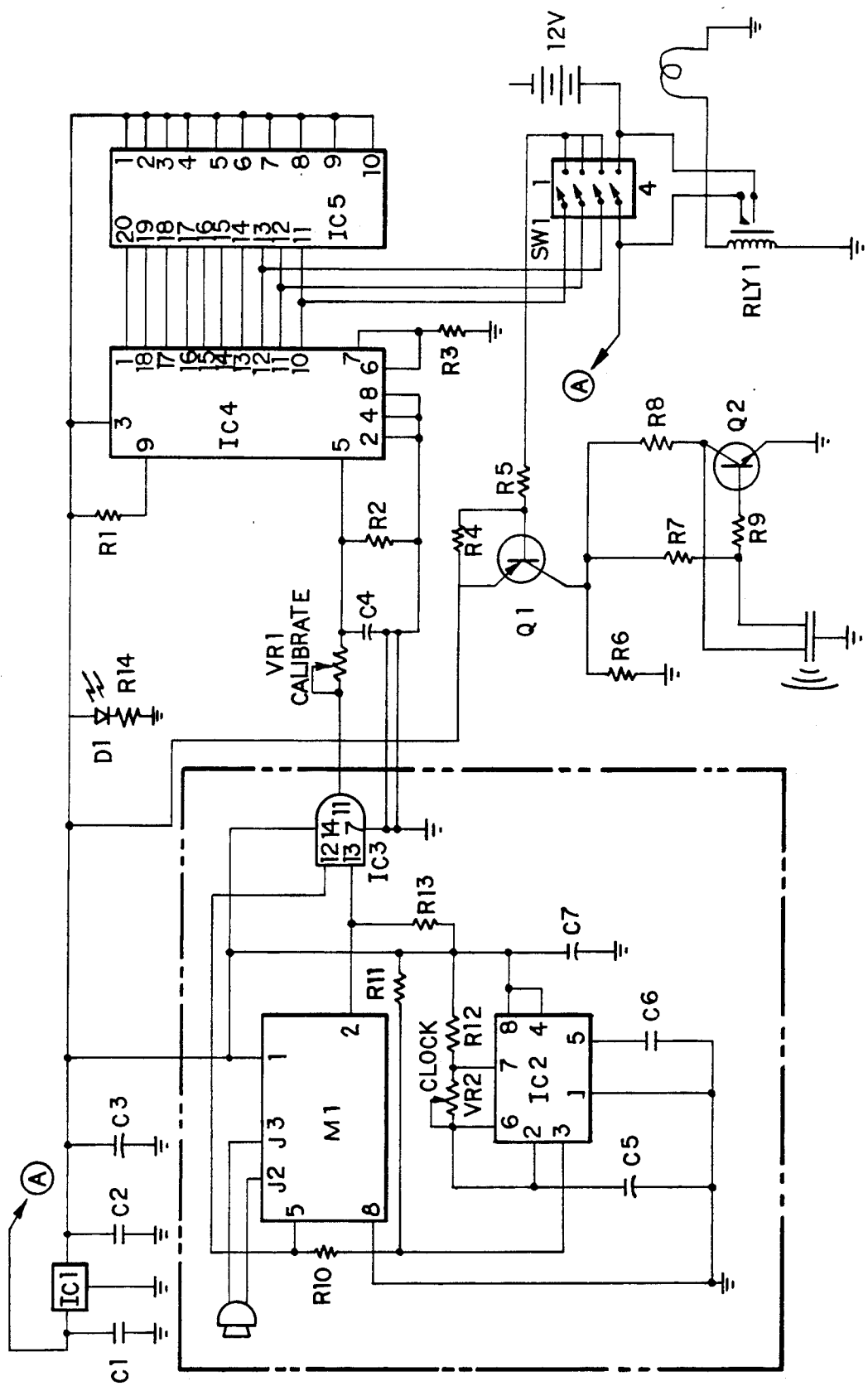
FIG. 5 is a diagram of the electronic circuitry of the preferred embodiment of the invention.

Power can be supplied by a 12 volt source, see FIG. 5, typically available in an automobile.

Attention is directed to the circuitry set forth in FIG. 5. The components therein depicted are "off the shelf" to simplify their acquisition.

IC-1, typically #MC7805C, provides a regulated +5 V dc supply for the entire circuit. C-1 and C-2 are used to eliminate any oscillation which may occur on the power line. C-3 is used to smooth any edge spikes which may occur.

Module M-1, typically #SN28827, is a self contained transmitter and receiver designed to drive an ultrasonic transducer at a frequency of 50 KHz. Power to the module is supplied at M-1, pin 1. IC-2, typically #MC1455, is a CMOS timer running in the astable mode to provide a system clock pulse of 100 ms duration. The clock pulse, the initiate pulse for M-1, is connected to pin M-1, pin 5. The clock pulse is also connected to AND Gate IC-3, typically #CD40818.

IC-3 ands together the clock pulse and an echo pulse generated by M-1. The output of IC-3 is a pulse whose width is directly related to the time it takes a short burst of ultrasonic waves to travel to an object, reflect and travel back to the transducer.

The output of IC-3 is connected to trimpot VR-1, typically 500 k ohms which in combination with C-4, typically 2.2 microfarads and R-2 typically 150 k ohms, filters the pulse into an analog level. The wave form at this point takes on the shape of a slight sawtooth. This sawtooth is used to produce a modulated LED flash. The DC level is connected to IC-4, typically LM3914N a 10 LED analog driver at IC-4, pin 6. The 10 outputs are directly connected to IC-5 which is a tricolor 10 LED package; typically 4 green, 3 yellow and 3 red positions.

IC-5, pins 11, 12 and 13 are connected to switching transistor Q-1, typically #3906, through selector switch SW-1. These pins are the cathodes of the 3 red LEDs. If switch position SW-1, 1 is closed, and the LED connected to IC-5, pin 11 is actuated, the base of Q-1 will be pulled low and the transistor will actuate. This will supply current to the oscillator circuit consisting of Q-2, typically #3904, R-7, typically 220 k ohms, R-8 typically 470 ohms, R-9, typically 10 k ohms and PIEZO-1. This will produce a tone at 6.5 KHz. The tone will also be modulated by the sawtooth wave form at IC-4, pin 5.

RLY-1 is used in conjunction with the vehicle backup lamp. When the lamp is turned on, RLY-1 will close and actuate the circuit, providing SW-1, 4 is open.

D-1 and R14 indicate that power is "on."

In switch position #1 (FIG. 5), a tone is produced in the four foot range. IC-5 provides a visual indication, namely one green bar for substantially out-of-range, typically 40 feet which changes to 4 green bars at typically 28 feet, one yellow bar at 24 feet to three yellow bars at 16 feet and one red bar at 12 feet to 3 red bars indicating the 4 foot range whereupon the tone sounds.

Simultaneously with the acquisition of an echo within the selected range an audio signal is emitted at horn H-1 which is intermitted at a pulse rate of 10 ms on, 9 oms off at 90% of selected range increasing to 80 ms on, 20 ms off off at 30% to a virtually steady tone at 25% of the selected distance, typically 1 foot if the 4 foot range is selected.

Since many modifications, variations and changes in detail may be made to the presently described embodiment, it is intended that all matter in the foregoing description and accompanying drawings be interpreted as illustrative and not by way of limitation.

What is claimed is:

1. An ultrasonic detector for detecting an object in a manually operated vehicle having a stern which defines a pathway when the vehicle is traveling in reverse comprising:

(a) means for generating and transmitting an ultrasonic wave externally sternward from the vehicle;

(b) means to focus the transmitted ultrasonic wave into a defined beam pattern the means comprising:
  (1) a primary convex reflector inclined at a defined angle of reflectance disposed in the path of the wave and having a defined radius of convexity;
  (2) a hood over the reflector;
  (3) a secondary reflector combination consisting of first and second planar baffles disposed upon the convex surface centrally upward which are inclined away from each other vertically at a defined angle and are spaced apart so as to divide the ultrasonic wave into 3 portions;
(c) means for receiving an echo of the ultrasonic wave and converting it into audio-visual signals indicative of the distance of an object from the vehicle's stern.

2. An ultrasonic detector as in claim 1 wherein the defined beam is focused such that it is directed along the vehicle's pathway, is flattened by the hood to a height substantially less than the height of the vehicle and is widened such that it will occupy a region to the vehicle's stern along its length.

3. An ultrasonic detector as in claim 1 wherein the reflector is inclined at an angle of reflectance of 45 degrees.

4. An ultrasonic detector as in claim 1 wherein the radius of convexity of the reflector is between 4 and 5 inches.

5. An ultrasonic detector as in claim 1 wherein the upwardly disposed baffles are inclined toward each other at about 10 degrees from the vertical.

6. An ultrasonic detector as in claim 1 wherein the audiovisual interpreting means is comprised of an LED display and a horn.

7. An ultrasonic detector as in claim 6 wherein the LED display indicates color changes responsive to the distance from the vehicle's stern to the object.

8. An ultrasonic detector as in claim 7 wherein the LED indicates a first color at a distance from the vehicle's stern to the object when the object is substantially out of a defined selectable range, a second color when the distance of the object to the stern is at approximately 130% of the defined range and a third color when said distance is within range.

9. An ultrasonic detector as in claim 8 wherein the selectable range is four, eight or twelve feet.

10. An ultrasonic detector as in claim 6 wherein the horn emits an intermittent audio-signal which is proportional to the distance from the object to the stern.

11. An ultrasonic detector as in claim 1 wherein a first of the 3 portions of the ultrasonic wave is reflected from the reflector perpendicularly sternward, a second and a third portion are reflected from the baffle glancingly to the reflector and then along the vehicle's stern.

12. An ultrasonic detector for detecting an object in a manually operated vehicle having a stern which defines a pathway when the vehicle is traveling in reverse comprising:
  (a) means for generating and transmitting an ultrasonic wave externally sternward from the vehicle;
  (b) means to focus the transmitted ultrasonic wave into a defined beam pattern the means comprising:
    (1) a primary convex reflector inclined at a defined angle of reflectance disposed in the path of the wave and having a defined radius of convexity;
    (2) a hood over the reflector;
    (3) a second reflector combination consisting of first and second planar baffles disposed upon the convex surface centrally upward which are inclined away from each other vertically at a defined angle and are spaced apart so as to divide the ultrasonic wave into 3 portions; wherein a first portion of the wave is reflected from the reflector perpendicularly sternward, and second and third portions are reflected from the baffles glancingly to the reflector and then along the vehicle's stern;
    (4) a means for receiving an echo of the ultrasonic wave and converting it into audio-visual signals for determination of the distance of an object from the vehicle's stern.

13. An ultrasonic detector as in claim 12 wherein the defined beam's first portion is focused such that it is directed along the vehicle's pathway and is flattened by the hood to a height substantially less than the height of the vehicle and the defined beam's second and third portions are widened such that they will occupy a region to the vehicle's stern along its length.

14. An ultrasonic detector as in claim 12 wherein the reflector is inclined at an angle of reflectance of 45 degrees.

15. An ultrasonic detector as in claim 12 wherein the radius of convexity of the reflector is between 4 and 5 inches.

16. An ultrasonic detector as in claim 12 wherein the upwardly disposed baffles are inclined toward each other at about 10 degrees from the vertical.

17. An ultrasonic detector as in claim 12 wherein the audio-visual converting means is comprised of an LED display and a horn.

18. An ultrasonic detector as in claim 17 wherein the LED display indicates color changes responsive to the distance from the vehicle's stern to the object.

19. An ultrasonic detector as in claim 17 wherein the LED indicats a first color at a distance from the vehicle's stern to the object when the object is substantially out of a defined selectable range, a second color when the distance of the object to the stern at approximately 130% of the defined range and a third color when said distance is within range.

20. An ultrasonic detector as in claim 19 wherein the selectable range is four, eight or twelve feet.

21. An ultrasonic detector as in claim 19 wherein the horn emits an intermittent audio-signal which is proportional to the distance from the object to the stern.

* * * * *